6 Sheets—Sheet 1.

F. HOLUB.
Horseshoe Machine.

No. 205,644. Patented July 2, 1878.

WITNESSES
Wm A. Skinkle
Roberdean Buchanan

INVENTOR
Frank Holub.
By his Attorneys
Baldwin, Hopkins, & Peyton.

N. PETERS, PHOTO-LITHOGRAPHER, WASHINGTON, D. C.

6 Sheets—Sheet 3.

F. HOLUB.
Horseshoe Machine.

No. 205,644. Patented July 2, 1878.

WITNESSES
Wm A Skinkle
Roberdeau Buchanan

INVENTOR
Frank Holub.
By his Attorneys
Baldwin, Hopkins, & Peyton

F. HOLUB.
Horseshoe Machine.

No. 205,644.  Patented July 2, 1878.

WITNESSES
Wm A Skinkle
Roberdeau Buchanan

INVENTOR
Frank Holub.
By his Attorneys
Baldwin, Hopkins, & Peyton.

6 Sheets—Sheet 5.

F. HOLUB.
Horseshoe Machine.

No. 205,644. Patented July 2, 1878.

WITNESSES
Wm A Skinkle
Roberdeau Buchanan

INVENTOR
Frank Holub
By his Attorneys
Baldwin, Hopkins, & Peyton

N. PETERS, PHOTO-LITHOGRAPHER, WASHINGTON, D. C.

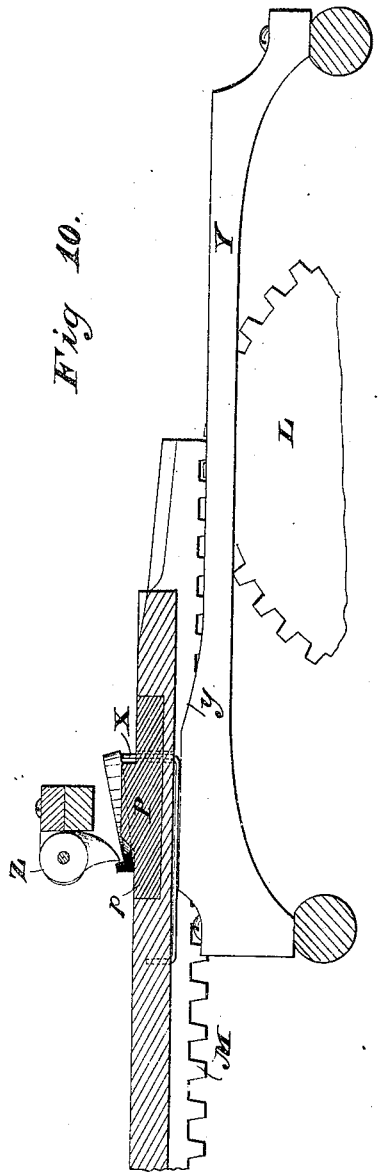

UNITED STATES PATENT OFFICE.

FRANK HOLUB, OF CHICAGO, ILLINOIS, ASSIGNOR OF TWO-THIRDS HIS RIGHT TO NATHAN E. PLATT AND EDWIN THORN, OF SAME PLACE.

IMPROVEMENT IN HORSESHOE-MACHINES.

Specification forming part of Letters Patent No. 205,644, dated July 2, 1878; application filed June 18, 1878.

*To all whom it may concern:*

Be it known that I, FRANK HOLUB, of Chicago, in the county of Cook and State of Illinois, have invented an Improved Machine for Bending and Swaging Horseshoe-Blanks, of which the following is a specification:

My invention consists in certain useful combinations of mechanism, as hereinafter specified and claimed.

Figure 1:
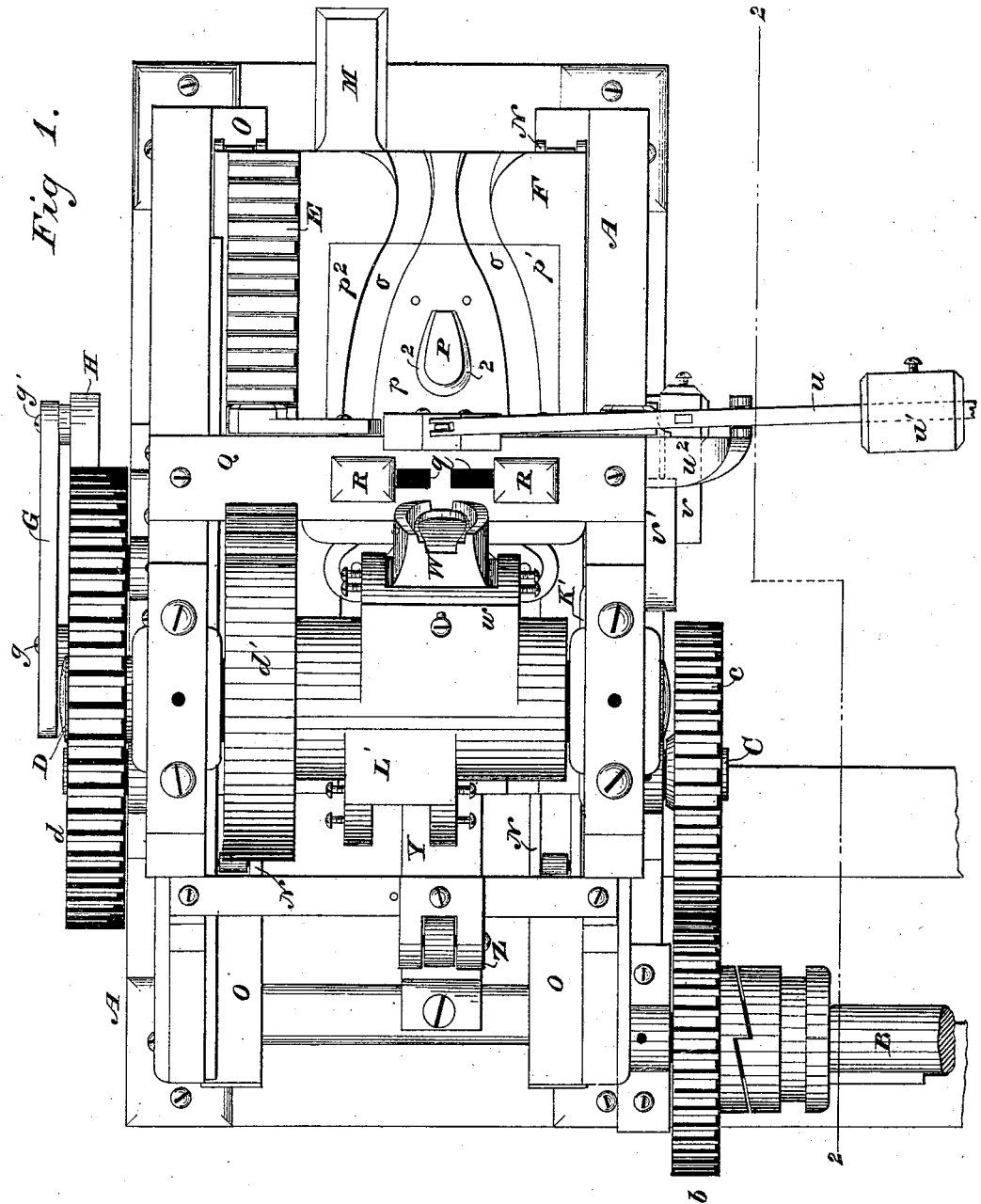
Figure 2:
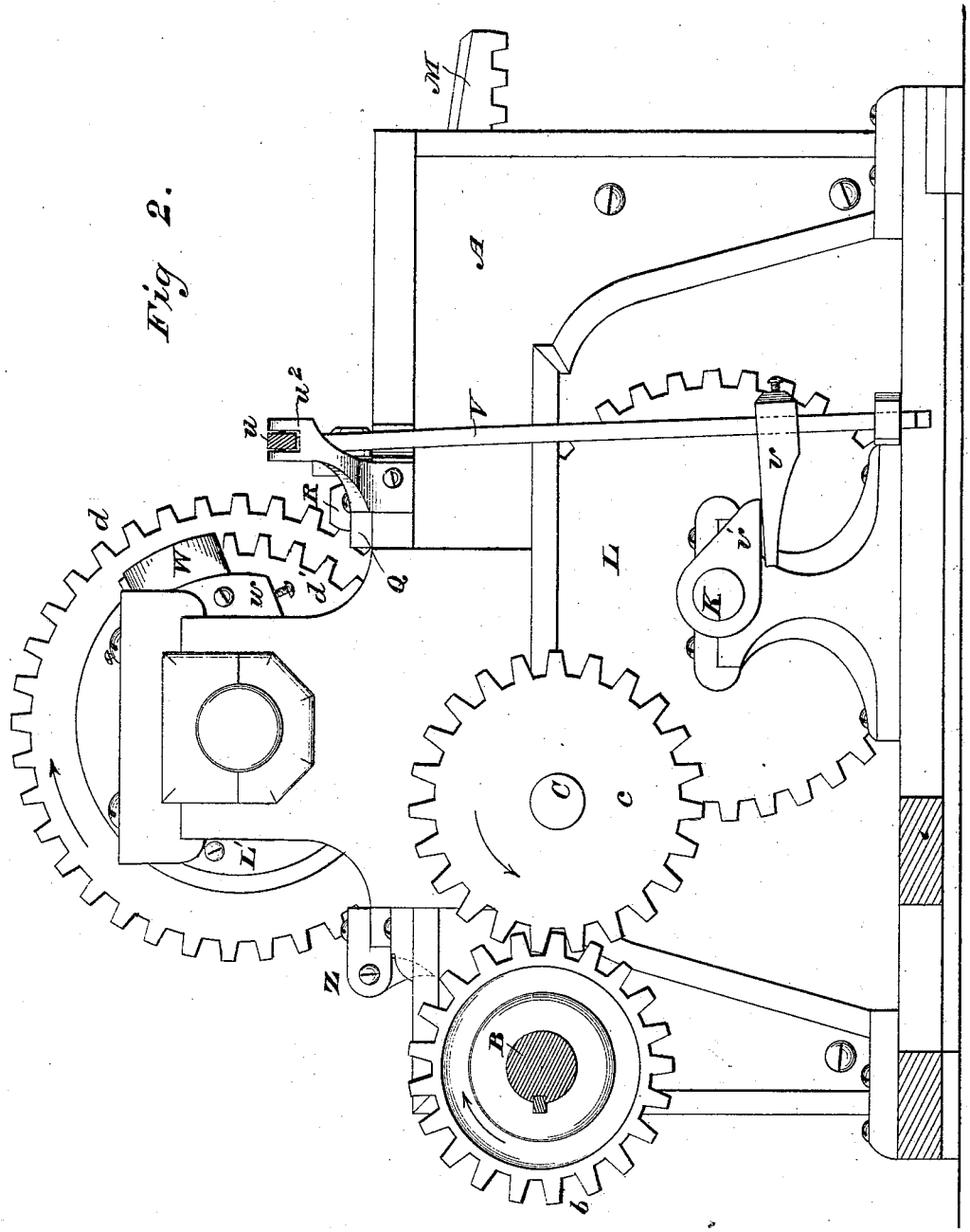
Figure 3:
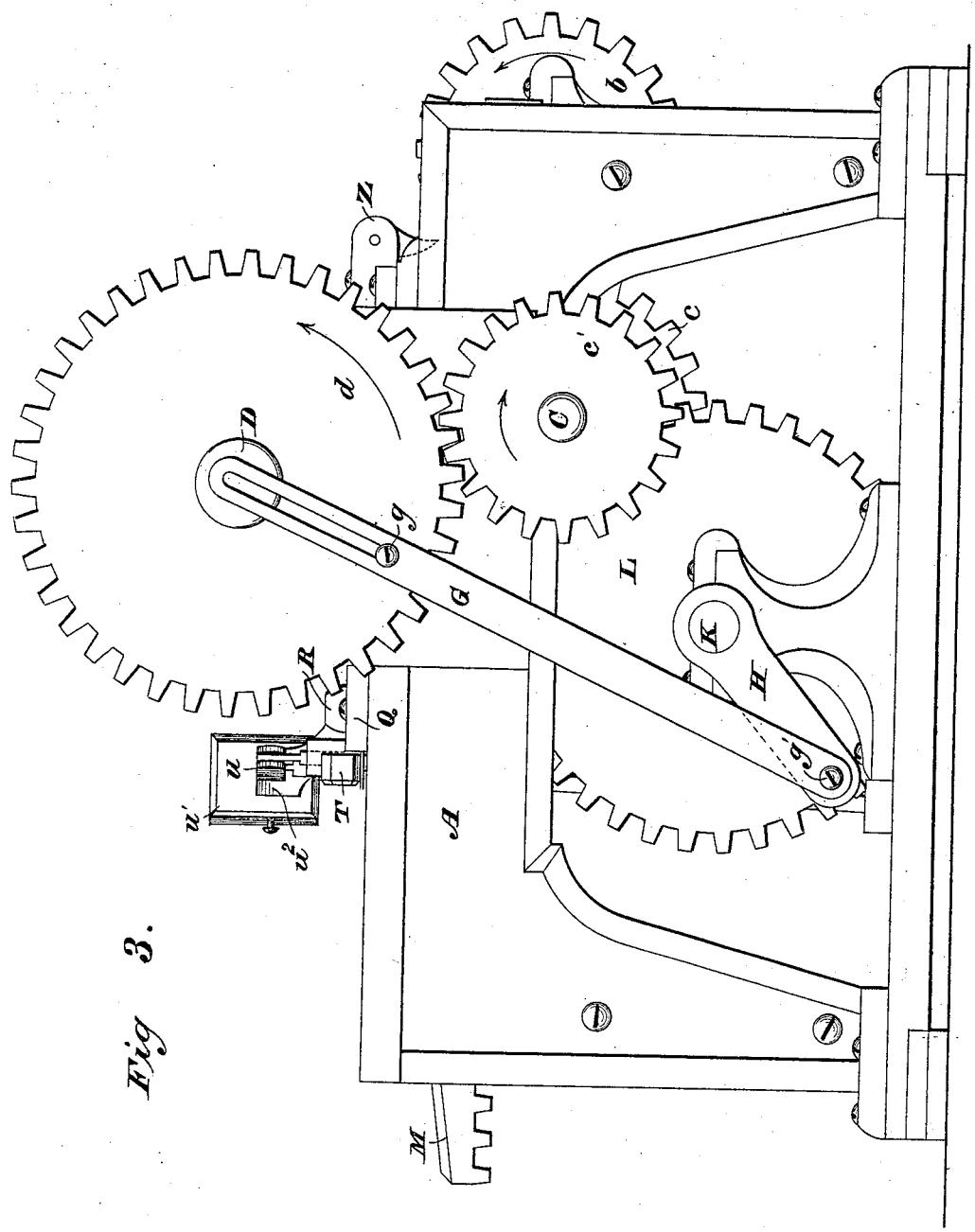
Figure 4:
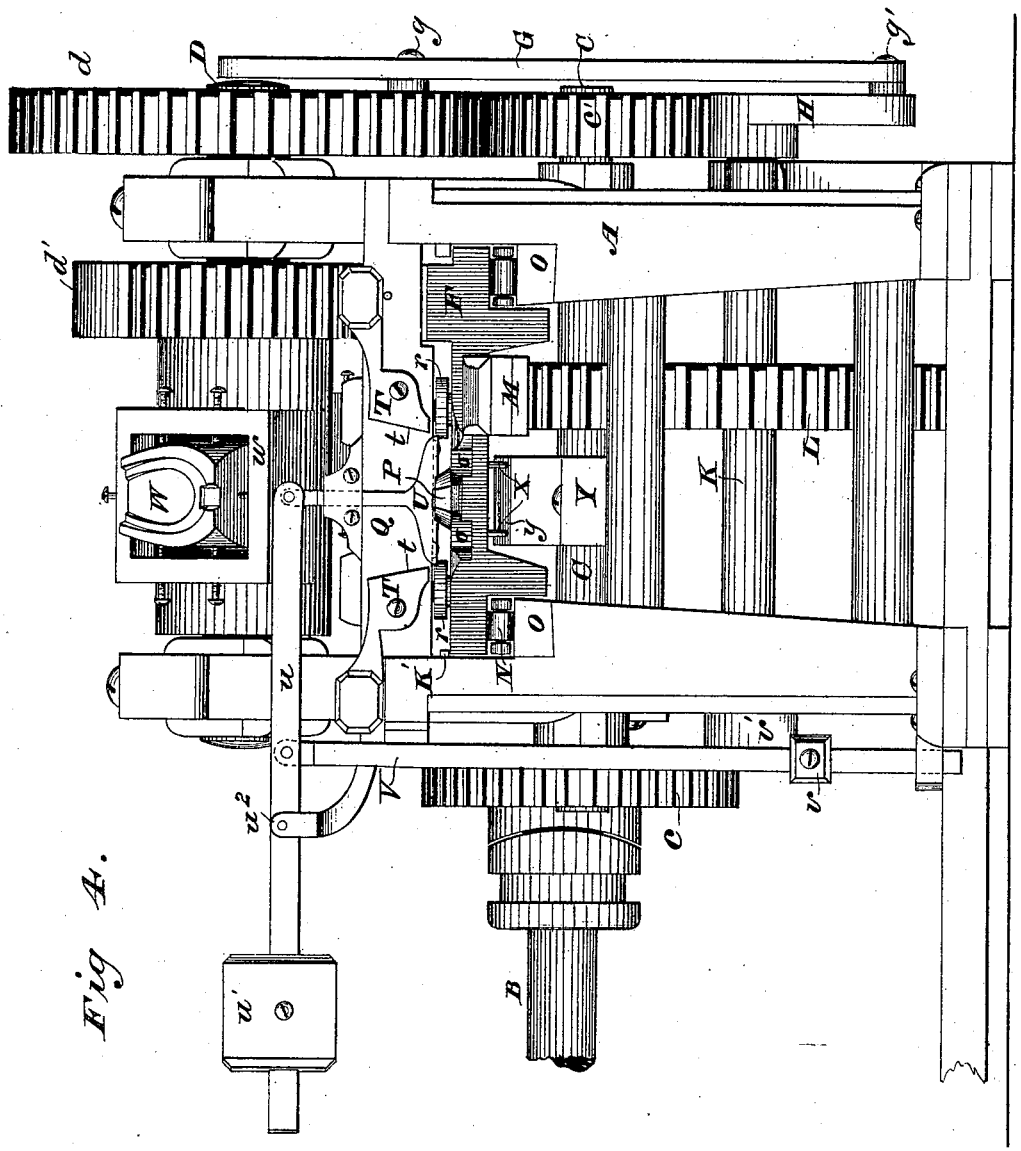
Figure 5:
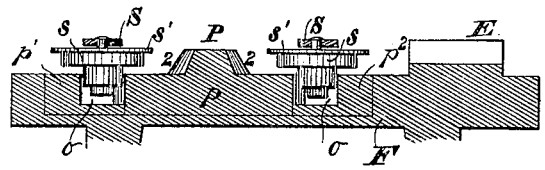
Figure 6:
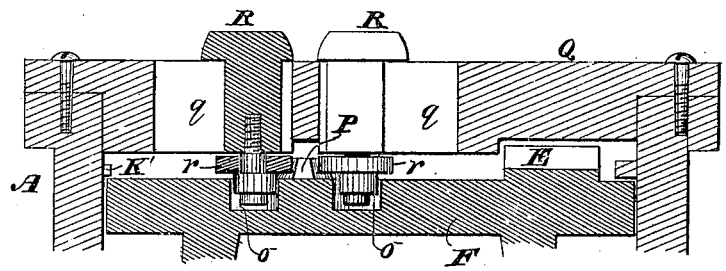
Figure 7:
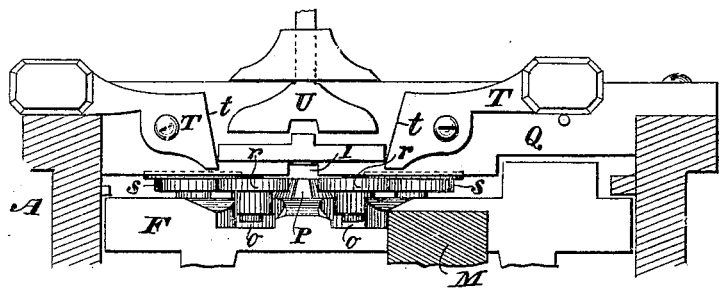
Figure 8:
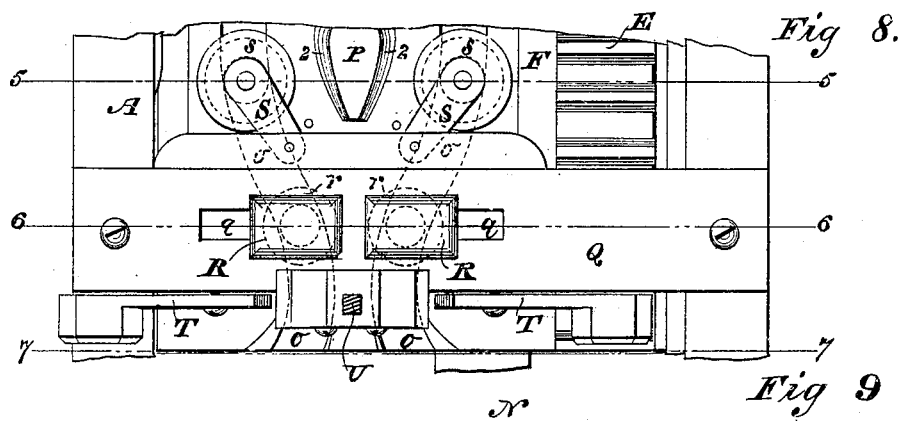
Figure 9:
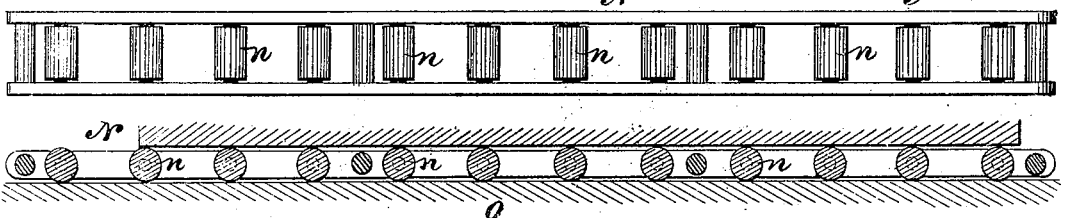

In the accompanying drawings illustrating my invention, Figure 1 is a plan view of my machine; Fig. 2, a side elevation, partly in section, on the line 2 2 of Fig. 1; Fig. 3, a similar view on the opposite side; Fig. 4, front-end elevation; Fig. 5, a vertical transverse section on the line 5 5 of Fig. 8; Fig. 6, a similar section on the line 6 6 of Fig. 8; Fig. 7, a similar section on the line 7 7 of Fig. 8; Fig. 8, a plan view of a portion of the center of the machine; Fig. 9, a plan and side elevation of an anti-friction-roller frame; Fig. 10, a detail view, partly in central longitudinal section.

A indicates a suitable frame, in which the main driving-shaft B is mounted. A pinion, $b$, on this main shaft gears into a pinion, $c$, on the shaft C. A similar pinion, $c'$, on the opposite end of the shaft C gears into wheel $d$ of shaft D, which shaft also carries a segmental pinion, $d'$, that gears into rack-bar E on the upper side of the reciprocating bed-plate or table F. A longitudinally-slotted pitman, G, is secured at its upper end loosely on the crank-pin $g$ of the wheel $d$, and at its lower end to the crank-pin $g'$ of the crank H of the rock-shaft K, bearing in brackets on the main frame and carrying the wheel L, which gears into the rack-bar M on the lower side of the reciprocating table. These parts thus far described constitute the main gearing of my machine, and their operation is as follows: Supposing the reciprocating table to be at the limit of its forward movement, when motion is communicated to the main driving-shaft in the direction indicated by the arrow, it will cause the revolution of the shaft D, with its wheel $d$ and segmental pinion $d'$, which latter, engaging in the rack-bar E, will cause the table to move to the rear until the spurs of the segmental pinion disengage from the upper rack-bar, when the table will stop and remain at rest, while a part of the plain face of the pinion revolves over it, and the crank-pin $g$ will move in the slot at the upper end of the pitman G till it strikes its bottom, when the pitman will set in motion the rock-shaft K, and wheel L, engaging with the lower rack-bar M, will cause the movement of the table back to the point of starting.

In order to facilitate these reciprocations of the table, I provide a pair of roller-frames, N, carrying friction-rollers $n$, which frames support the table, and roll back and forth under it on suitable ways O, provided in the main frame.

On the top of the table, near its forward end, I place an anvil or former, P, for bending and swaging heated horseshoe-blanks. On either side, and at a little distance from this former, I provide in the face of the table two bent grooves or guideways, $o$ $o$. I may cast my anvil and curved grooves with the bed-plate; but it is much preferable to cast straight grooves and a cavity in the plate, and then to form the curved continuation of the grooves and the anvil of three plates, $p$ $p^1$ $p^2$, of steel or hardened iron, as shown in Figs. 1 and 5.

Above the surface of the table I provide a cross-beam, Q, resting on each side of the main frame, and having longitudinal vertical slots $q$ $q$. Fitting loosely in these slots, so as to reciprocate laterally, are two carrier-blocks, R R, the lower ends of which engage in the guideways $o$ $o$, and carry friction-wheels or benders $r$ $r$. Pivoted to the cross-beam, or to a projection in rear of the blocks and friction-wheels just described, are two right-angular arms or brackets, S S, which, by their downward projections, also engage in the guideways $o$ $o$ and carry friction-wheels $s$ $s$.

Pivoted on the front side of the cross-beam are two weighted levers or jaws, T T, with inclined ends $t$ $t$. Between the inclined ends of these jaws works a blank feeder or plunger, U, pivoted to a lever, $u$, carrying a weight, $u^1$, and fulcrumed in a bracket, $u^2$. Pivoted to this weighted lever is a cam-rod, V, carrying a cam, $v$, which at the proper moment is struck by a cam, $v'$, on the rock-shaft K, which causes the plunger U to descend, as will be obvious from inspection of the drawings.

The operation of the parts last described is as follows: Supposing the table to be at the limit of its forward motion and the plunger U to be elevated by its counterbalance-weight, which is its normal position, and a heated horseshoe-blank to be placed between the inclined ends of the jaws T T, it is obvious that their weighted ends will cause the jaws to hold the blank, as illustrated in Fig. 7. Now, as the movement of the machine progresses, the cam $v'$ will strike the cam $v$ and depress the plunger U, and carry the heated blank down in proper position upon the table behind the former P, the jaws yielding on their pivots for that purpose. As the motion of the machine continues, the cam $v'$ will disengage from the cam $v$, and the counterbalance-weight will elevate the plunger U to its original position; and as the table moves backward, it will carry the blank under the cross-beam until its ends strike against the friction-rollers $r$ $r$, the notch 1 being provided on the under side of the cross-beam to permit a toe-calk, if any, in the center of the blank to pass. In this position the blank will rest, the table sliding under it, till the former P strikes it in the middle, when, as the table continues to move backward, it will be bent around the former, the curves in the forward ends of the guide-ways $o$ $o$ causing the front set of friction-wheels to clamp it tightly and to partly swage up the heel portions of the blank.

The rear set of friction-wheels $s$ $s$ are slightly greater in diameter than the front set, and they follow up the front set, supporting and supplementing them in their work, finishing the bending and the swaging of the heels of the blank. I provide the rear set of friction-wheels with flanges $s'$ $s'$, which project over the upper surface of the bent blank and hold it in place on the anvil while it is being swaged by the die W.

The next operation is the swaging of the bent blank upon the former or anvil to give the shoe the proper bevel or concave upon its upper side, that is to fit the hoof. To accomplish this, the anvil P is suitably beveled or inclined on its sides, as shown at 2 2, and I provide a die, W, seated adjustably in a suitable carrier, $w$, on the shaft D, and revolving with said shaft. This die is so adjusted in position as to clamp down upon the bent blank on the former and swage it as it passes along with the table to the rear.

The final operation to be effected is the removal of the bent and swaged blank from the former and from the table. This is accomplished by means of two lifting-plungers, X X, passing through the table close to the rear end of the former, and projecting beneath and impinging against beam Y, provided near its rear end with an inclined plane, $y$. As the table carries these downwardly-projecting plungers over the inclined plane $y$ it elevates them, causing them to project above the surface of the table and to lift the rear end of the bent blank from the former, as shown in Fig. 10. Being thus loosened, with its rear end elevated, the blank will pass along with the table till the pivoted adjustable catch Z has ridden over it and dropped behind it. Then, as the table returns to the front, the catch will engage with the bent blank, take it off from the former, and hold it until the table has slid from under it, when it will drop into any suitable receptacle.

Having thus described the construction and mode of operation of my machine, what I claim as my invention, and desire to secure by Letters Patent, is—

1. The combination of the driving-shaft B, the shafts C and D, with their gears, the segmental pinion, the slotted pitman, the rock-shaft and its crank and wheel L, the reciprocating bed-plate, and its upper and lower rack-bars, substantially as described.

2. The combination of the shafts and gearing, the double-racked table reciprocated thereby, the pivoted jaws, the plunger, weighted lever, cam-rod, and cams, whereby the heated blank is fed to the table, substantially as described.

3. The combination of the anvil or former, the bent grooves $o$ $o$, and the two sets of bending and heel-swaging friction-wheels, substantially as described.

4. The combination, with the reciprocating table and anvil, of the two sets of laterally-oscillating bending and swaging friction-wheels, the rear set being of greater diameter than the front set, and provided with holding-flanges on their peripheries, substantially as described.

5. The combination of the reciprocating table, the blank-lifting plungers, the inclined plane, and the adjustable pivoted catch Z, whereby the blanks are raised and removed from the machine, substantially as described.

In testimony whereof I have hereunto subscribed my name.

FRANK HOLUB.

Witnesses:
M. S. HOPKINS,
WOODBURY LOWERY.